:

US006992135B2

(12) United States Patent
Boehm et al.

(10) Patent No.: US 6,992,135 B2
(45) Date of Patent: *Jan. 31, 2006

(54) MULTI-LAYER GOLF BALL WITH A THIN, CASTABLE OUTER LAYER

(75) Inventors: Herbert C. Boehm, Norwell, MA (US); William E. Morgan, Barrington, RI (US); Jeffrey L. Dalton, North Dartmouth, MA (US); Douglas E. Jones, Dartmouth, MA (US); Christopher Cavallaro, Lakeville, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 125 days.

This patent is subject to a terminal disclaimer.

(21) Appl. No.: 10/667,935

(22) Filed: Sep. 22, 2003

(65) Prior Publication Data

US 2004/0058748 A1  Mar. 25, 2004

Related U.S. Application Data

(60) Division of application No. 10/097,161, filed on Mar. 13, 2002, now Pat. No. 6,677,401, which is a continuation-in-part of application No. 09/274,015, filed on Mar. 22, 1999, which is a continuation-in-part of application No. 08/863,788, filed on May 27, 1997, now Pat. No. 5,885,172, said application No. 10/667,935 is a continuation-in-part of application No. 09/594,031, filed on Jun. 15, 2000, now Pat. No. 6,414,082, which is a continuation-in-part of application No. 09/436,738, filed on Nov. 9, 1999, now Pat. No. 6,384,136, which is a continuation of application No. 08/950,197, filed on Oct. 14, 1997, now Pat. No. 5,981,658, which is a continuation-in-part of application No. 08/658,338, filed on Jun. 5, 1996, now Pat. No. 5,824,746, which is a continuation-in-part of application No. 08/482,514, filed on Jun. 7, 1995, now Pat. No. 5,703,166, which is a continuation-in-part of application No. 08/377,553, filed on Jan. 24, 1995, now abandoned.

(51) Int. Cl.
A63B 37/12 (2006.01)
(52) U.S. Cl. ............................ 525/74; 525/72; 473/373; 473/374
(58) Field of Classification Search ................ 473/373, 473/374
See application file for complete search history.

(56) References Cited

U.S. PATENT DOCUMENTS

| 3,147,324 A | 9/1964 | Ward ........................... 264/254 |
| 3,177,280 A | 4/1965 | Ford et al. ................... 264/275 |
| 3,262,272 A | 7/1966 | Barakauskas et al. ....... 60/39.05 |
| 3,572,722 A | 3/1971 | Harrison et al. ............. 273/218 |
| 3,616,101 A | 10/1971 | Satchell et al. ................. 161/7 |
| 3,989,568 A | 11/1976 | Isaac ........................... 156/182 |
| 4,203,941 A | 5/1980 | Brooker ....................... 264/250 |
| 4,274,637 A | 6/1981 | Molitor ................... 273/235 R |
| 4,431,193 A | 2/1984 | Nesbitt ......................... 273/235 |
| 4,625,964 A | 12/1986 | Yamada ........................ 273/62 |
| 4,781,383 A | 11/1988 | Kamada et al. .............. 273/228 |
| 4,848,770 A | 7/1989 | Shama ......................... 273/228 |
| 4,884,814 A | 12/1989 | Sullivan .................. 273/235 R |
| 4,919,434 A | 4/1990 | Saito ....................... 273/235 R |
| 4,959,000 A | 9/1990 | Giza ........................... 425/116 |
| 4,986,545 A | 1/1991 | Sullivan .................. 273/235 R |
| 5,002,281 A | 3/1991 | Nakahara et al. ............ 273/220 |
| 5,006,288 A | 4/1991 | Rhodes et al. .............. 264/46.6 |
| 5,006,297 A | 4/1991 | Brown et al. ................ 264/234 |
| 5,072,944 A | 12/1991 | Nakahara et al. ............ 273/220 |
| 5,098,105 A | 3/1992 | Sullivan .................. 273/235 R |
| 5,106,916 A | 4/1992 | Mitchell ....................... 525/255 |
| 5,112,556 A | 5/1992 | Miller ......................... 264/279 |
| 5,187,013 A | 2/1993 | Sullivan ..................... 428/407 |
| 5,253,871 A | 10/1993 | Viollaz ........................ 273/228 |
| 5,312,857 A | 5/1994 | Sullivan ..................... 524/400 |
| 5,314,187 A | 5/1994 | Proudfit .................. 273/235 R |
| 5,321,089 A | 6/1994 | Cadorniga et al. .......... 525/196 |
| 5,330,837 A | 7/1994 | Sullivan ..................... 428/407 |
| 5,334,673 A | 8/1994 | Wu ......................... 273/235 R |
| 5,338,610 A | 8/1994 | Sullivan ..................... 428/407 |
| 5,346,973 A | 9/1994 | Feustel et al. |
| 5,367,028 A | 11/1994 | Hamada et al. .............. 525/221 |
| 5,397,840 A | 3/1995 | Sullivan et al. .............. 525/221 |
| 5,407,998 A | 4/1995 | Horiuchi et al. ............. 525/133 |
| 5,415,937 A | 5/1995 | Cadornica et al. ........... 428/407 |
| 5,516,847 A | 5/1996 | Sullivan et al. .............. 525/221 |
| 5,542,677 A | 8/1996 | Sullivan et al. .............. 473/385 |
| 5,553,852 A | 9/1996 | Higuchi et al. .............. 473/378 |

(Continued)

FOREIGN PATENT DOCUMENTS

EP  0 633 043 A1  1/1995

(Continued)

OTHER PUBLICATIONS

Mathew H. Naitove, "Novel Rheological Behavior Claimed for New-Tech Polyolefins," Plastics Technology, Nov. 1992, pp. 23 & 25.

(Continued)

Primary Examiner—David J. Buttner
(74) Attorney, Agent, or Firm—William B. Lacy

(57) ABSTRACT

A golf ball including a core; an intermediate layer formed from a polymer blend including a first material having a flexural modulus of between about 65,000 psi and about 120,000 psi and a second material including a grafted-metallocene polymer; and a cover layer formed from a castable reactive liquid material.

13 Claims, No Drawings

U.S. PATENT DOCUMENTS

| | | | |
|---|---|---|---|
| 5,574,107 A | 11/1996 | Hiraoka et al. | 473/378 |
| 5,586,950 A | 12/1996 | Endo | 473/378 |
| 5,591,803 A | 1/1997 | Sullivan et al. | 525/196 |
| 5,609,535 A | 3/1997 | Morgan | 473/409 |
| 5,663,235 A | 9/1997 | Tanaka | 525/201 |
| 5,688,191 A | 11/1997 | Cavallaro | 473/373 |
| 5,692,974 A | 12/1997 | Wu et al. | 473/377 |
| 5,703,166 A | 12/1997 | Rajagopalan et al. | 525/196 |
| 5,704,852 A | 1/1998 | Kato | 473/357 |
| 5,733,428 A | 3/1998 | Calabria et al. | 264/134 |
| 5,759,676 A | 6/1998 | Cavallaro | 428/215 |
| 5,776,013 A | 7/1998 | Yokota | 473/373 |
| 5,779,561 A | 7/1998 | Sullivan | 473/373 |
| 5,779,562 A | 7/1998 | Melvin | 473/373 |
| 5,810,678 A | 9/1998 | Cavallaro | 473/373 |
| 5,813,923 A | 9/1998 | Cavallaro | 473/373 |
| 5,824,746 A | 10/1998 | Harris et al. | 525/196 |
| 5,830,087 A | 11/1998 | Sullivan et al. | 473/385 |
| 5,885,172 A | 3/1999 | Hebert et al. | 473/354 |
| 5,886,103 A | 3/1999 | Bellinger | 525/179 |
| 5,899,822 A | 5/1999 | Yamagishi et al. | 473/374 |
| 5,981,658 A | 11/1999 | Rajagopalan et al. | 525/72 |
| 6,057,403 A | 5/2000 | Sullivan et al. | 525/221 |
| 6,083,119 A | 7/2000 | Sullivan | 473/354 |
| 6,414,082 B1 * | 7/2002 | Rajagopalan et al. | 525/74 |
| 6,677,401 B2 * | 1/2004 | Boehm et al. | 525/72 |

FOREIGN PATENT DOCUMENTS

| | | |
|---|---|---|
| EP | 0 266 994 A2 | 5/1998 |
| GB | 2 278 609 A | 12/1994 |
| GB | 2291811 | 2/1996 |
| GB | 2291812 | 2/1996 |
| GB | 2291817 | 2/1996 |
| WO | WO 97/03123 | 1/1997 |
| WO | WO 97/03126 | 1/1997 |

OTHER PUBLICATIONS

T.C. Yu et al., "Polyolefin Modification with EXACT Plastomers, "SPE RETEC Polyolefins VIII Conferences, Feb. 1993.

Exxon Chmical Co., "Exact Facts," Exxpol Technology, Jun. 1994 pp. 1-8.

Robert D. Leaversuch, "Metallocene Resins: Is the Revolation for Real?" Modern Plastics, Jun. 1994, pp. 48-50.

Jan H. Schut, "Competition for Metallocenes Could Turn Ugly," Plastic World, Jan. 1995, pp. 33-36.

Sentinel Products Update, Metallocene Polyolefin Foam & Cellular Rubber, Summer 1995.

Smith et al., Application and Advantages of Flexible Metallocene Polyolefin Foams, SPO '95, 1995, pp. 95-107.

P.S. Chum et al., "Structure/Propert Relationships in Polyolefins Made by Constrained Geometry Catalyst Technology," Plastics Engineering, Jun. 1995, pp. 21-23.

Ann M. Thayer, "Metallocene Catalysts initiate New Era in Polymer Synthesis, " Chemical & Engineering New, Sep. 11, 1995, pp. 15-20.

* cited by examiner

MULTI-LAYER GOLF BALL WITH A THIN, CASTABLE OUTER LAYER

CROSS-REFERENCE TO RELATED APPLICATIONS

This application is a divisional of application Ser. No. 10/097,161, filed Mar. 13, 2002 now U.S. Pat. No. 6,677,401, which is a continuation-in-part of application Ser. No. 09/274,015, filed Mar. 22, 1999, which is a continuation-in-part of application Ser. No. 08/863,788, filed May 27, 1997, now U.S. Pat. No. 5,885,172.

This application is also a continuation-in-part of application Ser. No. 09/594,031, filed Jun. 15, 2000, now U.S. Pat. No. 6,414,082, which is a continuation-in-part of application Ser. No. 09/436,738, filed Nov. 9, 1999, now U.S. Pat. No. 6,384,136, which is a continuation of application Ser. No. 08/950,197, filed Oct. 14, 1997, now U.S. Pat. No. 5,981,658, which is a continuation-in-part of application Ser. No. 08/658,338, filed Jun. 5, 1996, now U.S. Pat. No. 5,824,746, which is a continuation-in-part of application Ser. No. 08/482,514, filed Jun. 7, 1995, now U.S. Pat. No. 5,703,166, which is a continuation-in-part of application Ser. No. 08/377,553, filed Jan. 24, 1995, now abandoned.

FIELD OF INVENTION

This invention relates generally to golf balls, and more specifically, to a multi-layer golf ball. In particular, this invention relates to a golf ball having a core, an intermediate layer, and a thin outer cover layer, wherein the outer cover layer comprises a material formed from a castable, reactive liquid, and the inner cover layer comprises a high flexural modulus material.

BACKGROUND OF THE INVENTION

Until recently golf balls were typically divided into two general types or groups: 1) two piece balls and 2) wound balls (also know as three piece balls). The difference in play characteristics resulting from these different types of constructions can be quite significant.

Balls having a two piece construction are generally most popular with the recreational golfer because they provide a very durable ball while also providing maximum distance. Two piece balls are made with a single solid core, usually formed of a crosslinked rubber, which is encased by a cover material. Typically the solid core is made of polybutadiene which is chemically crosslinked with zinc diacrylate and/or similar crosslinking agents. The cover comprises tough, cut-proof blends of one or more materials known as ionomers such as SURLYN®, which are resins sold commercially by DuPont or IOTEK® which is sold commercially by Exxon.

The combination of the above-described core and cover materials provides a "hard" covered ball that is resistant to cutting and other damage caused by striking the ball with a golf club. Further, such a combination imparts a high initial velocity to the ball which results in increased distance. Due to their hardness however, these balls have a relatively low spin rate which makes them difficult to control, particularly on shorter approach shots. As such, these types of balls are generally considered to be "distance" balls. Because these materials are very rigid, many two piece balls have a hard "feel" when struck with a club. Softer cover materials such as balata and softer ionomers in some instances, have been employed in two piece construction balls in order to provide improved "feel" and increased spin rates.

Wound balls typically have either a solid rubber or liquid filled center around which many yards of a stretched elastic thread or yarn are wound to form a core. The wound core is then covered with a durable cover material such as a SURLYN® or similar material or a softer cover such as balata. Wound balls are generally softer than two piece balls and provide more spin, which enables a skilled golfer to have more control over the ball's flight. In particular, it is desirable that a golfer be able to impart back spin to a golf ball for purposes of controlling its flight and controlling the action of the ball upon landing on the ground. For example, substantial back spin will make the ball stop once it strikes the landing surface instead of bounding forward. The ability to impart back spin onto a golf ball is related to the extent to which the golf ball cover deforms when it is struck with a golf club. Because wound balls are traditionally more deformable than conventional two piece balls, it is easier to impart spin to wound balls. However, wound higher spinning balls typically travel a shorter distance when struck as compared to a two piece ball. Moreover, as a result of their more complex structure, wound balls generally require a longer time to manufacture and are more expensive to produce than a two piece ball.

The United States Golf Association ("USGA") has instituted a rule that prohibits the competitive use in any USGA sanctioned event of a golf ball that can achieve an initial velocity of greater than 76.2 m/s, or 250 ft/s, when struck by a USGA velocity testing machine driver with a velocity of 43.76 m/s, i.e., 143.8 ft/s (referred to hereinafter as "the USGA test"). However, an allowed tolerance of two percent permits manufacturers to produce golf balls that achieve an initial velocity of 77.7 m/s (255 ft/s).

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

Therefore, golf ball manufacturers are continually searching for new ways in which to provide golf balls that deliver the maximum performance in terms of both distance and spin rate for golfers of all skill levels.

Relatively recently, a number of golf ball manufacturers have introduced multi-layer golf balls, i.e., having multiple core intermediate mantle or outer core layer and/or cover layers, In an effort to overcome some of the undesirable aspects of conventional two piece balls, such as their hard feel, while maintaining the positive attributes of these golf balls (including their increased initial velocity and distance). Examples of multi-layer balls include the Altus Newing® (Bridgestone), Reygrande 2x2®, Giga® (Spalding), Strata® (Spalding), Metal Mix® (Dunlop), and Ultra Tour Balata® (Wilson). Additionally, a number of patents have been issued directed towards modifying the properties of a conventional two piece ball by altering the typical single layer core and/or single cover layer construction to provide a multi-layer core and/or cover. The inventions disclosed in these patents are directed towards improving a variety of golf ball characteristics.

For example, there are a number of multi-layer ball patents directed towards improving the spin, click or feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. This patent teaches that it is desirable that the center core is softer than the outer layer, wherein the layers have a hardness (Shore C) of 25–50 and 70–90 respectively.

U.S. Pat. No. 4,625,964 relates to a solid golf ball having a polybutadiene rubber core of a diameter not more than 32 mm, and a polybutadiene rubber intermediate layer having a specific gravity lower than that of the core material.

U.S. Pat. No. 4,848,770 discloses a non-wound three-piece golf ball which includes a core of a highly filled synthetic rubber or polymeric material, an intermediate mantle or outer core layer of an unfilled synthetic rubber and a cover. The core and intermediate mantle or outer core layer have a hardness between 50–95.

U.S. Pat. No. 5,002,281 is directed towards a three-piece solid golf ball which has an inner core having a hardness of 25–70 (Shore C) and an outer shell having a hardness of 80–95 (Shore C), wherein the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

Several additional patents are directed to golf balls having multiple cover layers. For example U.S. Pat. No. 4,431,193 relates to a golf ball having a multi-layer cover wherein the inner layer is a hard, high flexural modulus ionomer resin and the outer layer is a soft, low flexural modulus ionomer resin, wherein either or both layers may comprise a foamed ionomer resin.

U.S. Pat. No. 5,314,187 also relates to golf balls having a cover formed with multiple layers, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise of materials that are capable of fusion bonding with each other.

UK Patent Application Nos. GB 2,291,817 and 2,291,812 are both directed towards a wound golf ball with improved distance comprising a dual cover layer, wherein the inner cover layer has a high hardness as compared to the outer cover layer. These references teach that the cover layers may be formed from balata or ionomer resins and should have a combined thickness of less than 4 mm.

UK Patent Application No. GB 2,278,609 discloses a multi-layer golf ball providing enhanced distance without sacrificing playability or durability comprising a core, an inner cover layer and an outer cover layer wherein the inner cover layer comprises a high acid ionomer and the outer cover layer comprises a soft ionomer or a non-ionomeric thermoplastic elastomer.

However, none of these patents disclose a multi-layer ball having a very thin thermoset outer layer formed from a castable reactive liquid as disclosed herein to provide golf balls exhibiting a "progressive performance" such as those golf balls of the present invention.

SUMMARY OF THE INVENTION

A golf ball comprising a core, an intermediate layer, and a cover layer; wherein the intermediate layer is formed of a polymer blend comprising an ionomer having at least about 16 percent acid groups and a grafted-metallocene polymer; and the cover layer comprises a castable reactive liquid material.

The outer cover layer thickness should be less than about 0.05 inches and, more preferably, between about 0.02 inches and about 0.04 inches. The outer cover should also have a Shore D hardness of between about 30 and about 60. The castable reactive liquid material of the outer cover typically includes thermoset or thermoplastic polyurethanes, polyureas, urethane ionomers, urethane epoxies, or a mixture thereof.

The intermediate layer has a Shore D hardness of about 65 to about 80, and a thickness of no greater than about 0.055 inches, more preferably between about 0.02 inches and about 0.045 inches. The polymer blend should have a flexural modulus of between about 65,000 psi and about 120,000 psi. The ionomer may also be a blend of two or more ionomers. The intermediate layer has an outer diameter of between about 1.58 and about 1.64 inches and, more preferably, between about 1.60 inches and about 1.63 inches.

The grafted-metallocene polymer can be foamed or unfoamed, and may also be formed from homopolymers and copolymers of ethylene; and a second olefin comprising propylene, butene, pentene, hexene, heptene, octene, and nonbornene. Preferably, the grafted metallocene polymer has the formula:

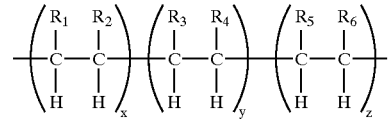

wherein $R_1$ is hydrogen, branched or straight chain alkyl such as methyl, ethyl, propyl, butyl, pentyl, hexyl, heptyl, and octyl, carbocyclic, aromatic or heterocyclic; $R_2$ is hydrogen, lower alkyl including $C_1$–$C_5$; carbocyclic, aromatic or heterocyclic; $R_3$ is hydrogen, lower alkyl including $C_1$–$C_5$, carbocyclic, aromatic or heterocyclic; $R_4$ is selected from the group consisting of H, $CH_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, aromatic or heterocyclic; $R_6$ is hydrogen, lower alkyl including $C_1$–$C_5$, carbocyclic, aromatic or heterocyclic; and x ranges from 1–99 percent, y ranges from 99–1 percent, and z ranges from 0 to 49 percent.

The grafted metallocene polymer can also be functionalized by sulfonation, carboxylation, the addition of an amine or hydroxy group, or a mixture thereof. Preferably, the grafted metallocene polymer is a maleic anhydride grafted metallocene polymer. The grafted metallocene polymer is present in an amount from about 5 to about 50 phr of the polymer blend and the ionomer is present in an amount from about 95 to about 50 phr of the polymer blend; more preferably, the grafted metallocene polymer is present in an amount from about 7 to about 16 phr of the polymer blend and the ionomer is present in an amount from about 93 to about 84 phr of the polymer blend. Additionally, the polymer blend has a melt flow index of at least about 3.

The present invention is additionally directed to a golf ball comprising a core, an intermediate layer, and a cover layer; wherein the intermediate layer is formed of a polymer blend comprising an ionomer having at least about 16 percent acid groups, a non-ionomer, and a grafted-metallocene polymer; and the cover layer comprises a castable urethane.

The outer cover layer thickness should be less than about 0.05 inches and, more preferably, between about 0.02 inches and about 0.04 inches. The outer cover should also have a Shore D hardness of between about 30 and about 60. The castable reactive liquid material of the outer cover typically includes thermoset or thermoplastic polyurethanes, polyureas, urethane ionomers, urethane epoxies, or a mixture thereof.

The intermediate layer has a Shore D hardness of about 65 to about 80, and a thickness of no greater than about 0.055 inches, more preferably between about 0.02 inches and about 0.045 inches. The polymer blend should have a flexural modulus of between about 65,000 psi and about 120,000 psi. The ionomer may also be a blend of two or more ionomers. The intermediate layer has an outer diameter of between about 1.58 and about 1.64 inches and, more preferably, between about 1.60 inches and about 1.63 inches.

The grafted-metallocene polymer can be foamed or unfoamed, and may also be formed from homopolymers and copolymers of ethylene; and a second olefin comprising propylene, butene, pentene, hexene, heptene, octene, and nonbornene. Preferably, the grafted metallocene polymer has the formula:

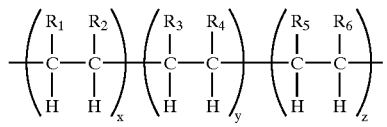

wherein $R_1$ is hydrogen, branched or straight chain alkyl such as methyl, ethyl, propyl, butyl, pentyl, hexyl, heptyl, and octyl, carbocyclic, aromatic or heterocyclic; $R_2$ is hydrogen, lower alkyl including $C_1$–$C_5$; carbocyclic, aromatic or heterocyclic; $R_3$ is hydrogen, lower alkyl including $C_1$–$C_5$, carbocyclic, aromatic or heterocyclic; $R_4$ is selected from the group consisting of H, $C_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, aromatic or heterocyclic; $R_6$ is hydrogen, lower alkyl including $C_1$–$C_5$, carbocyclic, aromatic or heterocyclic; and x ranges from 1–99 percent, y ranges from 99–1 percent, and z ranges from 0 to 49 percent.

The grafted metallocene polymer can also be functionalized by sulfonation, carboxylation, the addition of an amine or hydroxy group, or a mixture thereof. Preferably, the grafted metallocene polymer is a maleic anhydride grafted metallocene polymer. The grafted metallocene polymer is present in an amount from about 5 to about 50 phr of the polymer blend, the ionomer is present in an amount from about 95 to about 50 phr of the polymer blend, and the non-ionomer is present in an amount from about 1 to about 25 phr of the polymer blend, and more preferably, the grafted metallocene polymer is present in an amount from about 7 to about 16 phr of the polymer blend, the ionomer is present in an amount from about 93 to about 84 phr of the polymer blend, and the non-ionomer is present in an amount from about 1 to about 10 phr of the polymer blend. The polymer blend has a melt flow index of at least about 3.

The present invention is also directed to a golf ball comprising a core, an intermediate layer, and a cover layer; wherein the intermediate layer is formed of a polymer blend comprising an ionomer having at least about 16% acid groups and a non-ionomer; and the cover layer comprises a castable urethane.

The outer cover layer thickness should be less than about 0.05 inches and, more preferably, between about 0.02 inches and about 0.04 inches. The outer cover should also have a Shore D hardness of between about 30 and about 60. The castable reactive liquid material of the outer cover typically includes thermoset or thermoplastic polyurethanes, polyureas, urethane ionomers, urethane epoxies, or a mixture thereof.

The intermediate layer has a Shore D hardness of about 65 to about 80, and a thickness of no greater than about 0.055 inches, more preferably between about 0.02 inches and about 0.045 inches. The ionomer may also be a blend of two or more ionomers. The intermediate layer has an outer diameter of between about 1.58 and about 1.64 inches and, more preferably, between about 1.60 inches and about 1.63 inches.

The present invention is further directed to a golf ball comprising a core, an intermediate layer, and a cover layer; wherein the intermediate layer is formed of a polymer blend comprising at least about 80 weight percent of an ionomer having at least about 16 percent acid groups, a non-ionomer, and a grafted-metallocene polymer; and the cover layer comprises a castable urethane.

The outer cover layer thickness should be less than about 0.05 inches and, more preferably, between about 0.02 inches and about 0.04 inches. The outer cover should also have a Shore D hardness of between about 30 and about 60. The castable reactive liquid material of the outer cover typically includes thermoset or thermoplastic polyurethanes, polyureas, urethane ionomers, urethane epoxies, or a mixture thereof.

The intermediate layer has a Shore D hardness of about 65 to about 80, and a thickness of no greater than about 0.055 inches, more preferably between about 0.02 inches and about 0.045 inches. The ionomer may also be a blend of two or more ionomers. The intermediate layer has an outer diameter of between about 1.58 and about 1.64 inches and, more preferably, between about 1.60 inches and about 1.63 inches.

DETAILED DESCRIPTION OF THE INVENTION

By the present invention, it has been discovered that a golf ball of the presently claimed construction has a "progressive performance" when struck with a variety of clubs. More specifically, as used herein, the term "progressive performance" means that the presently claimed golf ball has the distance benefits of a traditional hard covered two piece ball when struck with a club having a high club head speed and a low loft angle, but also the high spin and feel characteristics similar to that of a traditional soft covered wound ball when struck with a club having a low head speed and high loft angle. Thus, golf balls of the presently claimed construction provide the best of both worlds in the golf ball art, i.e., a maximum distance ball for long shots (e.g., with a driver or long iron) which has high spin and controllability for short shots (e.g., with a wedge).

Without being limited to any particular theory, it is believed that with low club head speed and high loft shots such as those made with an 8-iron or a wedge, a ball's surface hardness has a greater influence on the ball's flight characteristics than the ball's overall construction. Thus, all other parameters being equal, a ball with a softer surface will have a higher spin rate than one with a harder surface, regardless of the ball's overall construction. Conversely, however, when a golf ball is struck with a high club head speed and a low loft angle, such as that of a driver, it appears that the opposite is true and that the overall construction of the ball has a greater influence on the ball's flight characteristics than does the surface hardness. For such high club head speed, low loft angle shots, i.e. full shots, it is desirable for the ball to have a low spin rate in order to achieve maximum distance.

A multi-layered core construction facilitates the ability to modify a ball's moment of inertia through the manipulation of the specific gravity of each individual core layer. By using a multi-layered core construction, a ball designer is able to control a ball's spin performance when hit with full shots. With full shots, the ball's inner construction greatly affects the ball's spin rate. Thus, the spin rate of driver and long iron shots can be controlled more precisely through use of multi-layer core technology. Further, the ball's feel can be influenced with greater control than can be achieved from a single solid core construction by modifying the hardness or compressibility of the individual layers.

Accordingly, by the present invention, it has been found that by creating a golf ball with a low spin construction, but adding a very thin layer of a relatively soft thermoset material formed from a castable reactive liquid, a golf ball with "progressive performance" from driver to wedge can be formed. As used herein, the term "thermoset" material refers to an irreversible, solid polymer that is the product of the reaction of two or more prepolymer precursor materials.

The invention is particularly directed towards a multi-layer golf ball which comprises a core, an inner cover layer and an outer cover layer. The thickness of the outer cover layer is critical to the "progressive performance" of the golf balls of the present invention. If the outer cover layer is too thick, this cover layer will contribute to the in-flight characteristics related to the overall construction of the ball and not the cover surface properties. However, if the outer cover layer is too thin, it will not be durable enough to withstand repeated impacts by the golfer's clubs. Specifically, it has been determined that the outer cover layer must have a thickness of less than about 0.05 inches, preferably between about 0.02 and about 0.04 inches. Most preferably, this thickness is about 0.03 inches.

The outer cover layer is formed from a relatively soft thermoset material in order to replicate the soft feel and high spin play characteristics of a balata ball when the balls of the present invention are used for pitch and other "short game" shots. In particular, the outer cover layer should have a Shore D hardness of from about 30 to about 60, preferably 35–50 and most preferably 40–45. Additionally, the materials of the outer cover layer must have a degree of abrasion resistance in order to be suitable for use as a golf ball cover.

The outer cover layer of the present invention can comprise any suitable thermoset material which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in co-pending U.S. patent application Ser. No. 08/482,519, filed Jun. 7, 1995, entitled "Golf Ball Covers," the disclosure of which is hereby incorporated by reference in its entirety in the present application.

Thermoset polyurethanes and urethanes are particularly preferred for the outer cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate ("TDI") or methylenebis-(4-cyclohexyl isocyanate) ("HMDI") and a polyol which is cured with a polyamine, such as methylenedianiline ("MDA"), or a trifunctional glycol, such as trimethylol propane, or tetrafunctional glycol, such as N,N,N',N'-tetrakis(2-hydroxypropyl)ethylenediamine. However, the present invention is not limited to just these specific types of thermoset polyurethanes. Quite to the contrary, any suitable thermoset polyurethane may be employed to form the outer cover layer of the present invention.

The inner cover layer of the present invention is preferably formed from a hard, high flexural modulus, resilient material which contributes to the low spin, distance characteristics of the presently claimed balls when they are struck for long shots (e.g. driver or long irons). Specifically, the inner cover layer materials have a Shore D hardness of about 65–80, preferably about 68–74, and most preferably about 70–72. Furthermore, as defined herein, the term "high flexural modulus" means a flexural modulus (as measured by ASTM 790) of at least about 65,000 psi, preferably about 70,000 psi to about 120,000 psi and most preferably at least about 75,000 psi. The thickness of the inner cover layer can range from about 0.020 inches to about 0.045 inches, preferably about 0.030 inches to about 0.040 inches and most preferably about 0.035 inches.

The inner cover layer may be formed from a wide variety of resilient materials. Among the preferred inner cover materials are hard, high flexural modulus ionomer resins and blends thereof. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably at least about 16, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. Additional ionomers are described in application Ser. Nos. 09/086,263, 08/996,403 and 08/786,618, all of which are incorporated by reference in their entirety.

The manner in which the ionomers are made is well known in the art as described in e.g., U.S. Pat. No. 3,262,272. Such ionomer resins are commercially available from DuPont under the tradename SURLYN® and from Exxon under the tradename Iotek®. Some particularly suitable SURLYNS® include SURLYN® 8140 (Na ionomer) and SURLYN® 8546 (Li ionomer) which have an methacrylic acid content of about 19%.

However, the materials for the inner cover layer are not limited to ionomer resins. Instead, the present invention contemplates that virtually any resilient material which is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrene-butadiene elastomer, a metallocene catalyzed polymer or blends thereof.

Suitable thermoplastic polyetheresters include materials which are commercially available from DuPont under the tradename HYTREL®. Suitable thermoplastic polyetheramides include materials which are available from Elf-Atochem under the tradename PEBAX®. Other suitable materials for the inner cover layer include nylon and acrylonitrile-butadiene-styrene copolymer.

The golf ball cores of the present invention may comprise any of a variety of constructions. For example, the core of the golf ball may comprise a conventional center surrounded by an intermediate mantle or outer core layer disposed between the center and the inner cover layer. The core may be a single layer or may comprise a plurality of layers. The innermost portion of the core may be solid or it may be a liquid filled sphere. As with the core, the intermediate mantle or outer core layer may also comprise a plurality of layers. The core may also comprise a solid or liquid filled center around which many yards of a stretched elastic thread or yarn are wound.

One embodiment of the present invention relates to a multi-layer golf ball having a solid center surrounded by at least one additional solid outer core layer having a resilient rubber based component and a crosslinking agent present in an amount from about 20 to about 40 parts per hundred of polymer, preferably having an amount of crosslinking agent from about 30 to about 38 parts per hundred of rubber and most preferably having about 37 parts crosslinking agent per hundred of rubber. It should be understood that the term "parts per hundred" is with reference to the rubber by weight.

The center of the ball is preferably solid having a resilient rubber component and a crosslinking agent present in an amount from about 15 to about 25 parts per hundred of the rubber, preferably in an amount from about 19 to about 25 parts per hundred of the rubber and most preferably having about 20 parts crosslinking agent per hundred of rubber.

The materials for solid cores include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel.

The initiator agent can be any known polymerization initiator which decomposes during the cure cycle. Suitable initiators include peroxide compounds such as dicumyl peroxide, 1,1-di(t-butylperoxy)3,3,5-trimethyl cyclohexane, a-a bis(t-butylperoxy)diisopropylbenzene, 2,5-dimethyl-2,5di(t-butylperoxy)hexane or di-t-butyl peroxide and mixtures thereof.

Conventional prior art golf balls typically incorporate 5 to 50 pph of zinc oxide in a diacrylate-peroxide core system. However, the zinc oxide may be replaced by calcium oxide in a diacrylate-peroxide system to provide a suitable core composition.

As used herein, the term "filler" includes any compound or composition that can be used to vary the density and other properties of the core. Fillers typically includes materials such as zinc oxide, barium sulfate, silica, calcium carbonate, zinc carbonate reground (recycled core material ground to 30 mesh particle) and the like.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere made from a thermoplastic or thermoset material into which a liquid such as corn syrup is injected by means of a needle. The sphere is then sealed and typically frozen to make the core a solid mass. The windings for either type of center are provided by an elastic thread which is stretched and wound about the core to a desired thickness.

The overall outer diameter ("OD") of the core (including the center and any intermediate mantle layer(s), the outer core layer or windings) together with the inner cover layer of the golf balls of the present invention is about 1.58 inches to about 1.64 inches, preferably about 1.60 inches to about 1.63 inches, more preferably about 1.62 inches to about 1.63 inches and most preferably about 1.62 inches. The outer diameter of the center of the core is about 0.75 inches to about 1.3 inches, preferably about 1 inch to about 1.15 inches. In another embodiment, the outer diameter of the core (including the center and any intermediate mantle layer(s) or windings) without the inner cover layer is about 1.5 inches to about 1.6 inches, preferably about 1.55 inches to about 1.58 inches.

The present multi-layer golf ball can have an overall diameter of any size. Although USGA specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The cores and inner cover of the golf balls of the present invention can be made by any conventional process employed in the golf ball art. For example, the solid centers can be either injection or compression molded. Similarly, the wound centers employed in the present invention can be produced through conventional means. The inner cover layer and any mantle or outer core layer(s) are subsequently injection or compression molded about the core.

However, due to the very thin nature (less than 0.05 inches), it is not practical to form the outer cover layers of the ball of the present invention using conventional injection or compression molding techniques ordinarily employed in the golf ball art for applying cover materials. These conventional ball molding processes are not capable of easily applying such thin outer cover layers over a solid spherical surface.

Accordingly, it has been found by the present invention that the use of a castable, reactive material which is applied in a fluid form makes it possible to obtain very thin outer cover layers on golf balls. Specifically, it has been found that castable, reactive liquids which react to form a thermoset material provide desirable very thin outer cover layers.

The castable, reactive liquid employed to form the thermoset material can be applied over the inner core using a variety of application techniques such as spraying, dipping, spin coating or flow coating methods which are well known in the art. An example of a suitable coating technique is that which is disclosed in U.S. Pat. No. 5,733,428, filed May 2, 1995 entitled "Method And Apparatus For Forming Polyurethane Cover On A Golf Ball," the disclosure of which is hereby incorporated by reference in its entirety in the present application. Similarly, U.S. Pat. No. 5,006,297 to Brown et al. and U.S. Pat. No. 5,334,673 to Wu both also disclose suitable coating techniques which may be utilized to apply the castable reactive liquids employed in the present invention. The disclosures of these patents are hereby incorporated by reference in their entirety. However, the method of the invention is not limited to the use of these techniques.

The following example of multi-layer golf balls formed according to the present invention is given to illustrate the present invention. However, it is to be understood that the example is for illustrative purposes only and in no manner is the present invention limited to the specific disclosures therein.

Grafted metallocene-catalyzed polymers and polymer blends may be thermoformed and, thus, can be either compression or injection molded to form a layer of foamed or unfoamed grafted metallocene-catalyzed polymer in the cover, center, or at least one mantle layer, if present, of a golf ball according to the invention. Grafted metallocene-catalyzed polymers and grafted metallocene-catalyzed polymer blends are resilient, easily processed materials that are less expensive than ionomers, and allow highly durable golf balls to be produced with improved performance and virtually any combination of feel and spin rate.

Golf balls according to the invention may incorporate cores comprising grafted metallocene-catalyzed polymers or polymer blends, non-grafted metallocene-catalyzed polymers or polymer blends, or conventional materials. Cores comprising at least one grafted metallocene-catalyzed polymer or polymer blend may be either one-piece, comprising a single piece of foamed or unfoamed grafted metallocene-catalyzed polymer or polymer blend, or multi-piece, comprising a fluid, hollow, or solid center and one or more mantle layers in which any of the center or at least one of the layers comprises a foamed or unfoamed grafted metallocene-catalyzed polymer, at least one ionomer and at least one non-ionomer, or polymer blend.

Conventional materials useful in forming centers or mantles of the golf balls of the invention include, but are not limited to, compositions having a base rubber, a crosslinking agent, a free radical initiator, and a density-adjusting filler. The base rubber typically includes natural or synthetic rubbers. A preferred base rubber is 1,4-polybutadiene having at least about 40% of a cis-structure. Natural rubber, polyisoprene rubber and/or styrene-butadiene rubber may be optionally used in place of or added to the 1,4-polybutadiene. Crosslinking agents include metal salts of unsaturated fatty acids, such as zinc or magnesium salts acrylic or methacrylic acid. The density-adjusting filler typically includes materials such as zinc oxide, barium sulfate, silica, calcium carbonate, zinc carbonate, tungsten, titanium, and the like.

Golf balls of the invention may also include a mantle layer situated between the cover and the center. In one preferred embodiment, the mantle layer comprises a least one layer of a foamed or unfoamed grafted metallocene-catalyzed polymer or polymer blend, but may also be formed from a non-grafted metallocene-catalyzed polymer or polymer blend or from any other suitable polymeric material having the desired properties. Any of the cover, center, and mantle layer may incorporate at least one layer of a foamed or unfoamed grafted metallocene-catalyzed polymer or polymer blend, at least one ionomer, and at least one non-ionomer. Moreover, the core may be a one-piece core, a multi-layer core, or a wound core, having a solid or liquid center. Indeed, golf balls of the invention may also have conventional wound cores, i.e., have a center with at least one mantle layer including a tensioned elastomeric thread.

Golf balls according to the invention may also incorporate cover layers comprising foamed or unfoamed grafted metallocene-catalyzed polymers or polymer blends, non-grafted metallocene-catalyzed polymers or polymer blends, or conventional materials, including balata and ionomer cover stock. Grafted metallocene-catalyzed polymer blend cover layers according to the invention may be used with conventional solid or wound cores, as well as those comprising grafted or non-grafted metallocene-catalyzed polymers or polymer blends. In another preferred embodiment, the cover of a golf ball according to the invention is formed from a blend comprising at least one grafted metallocene-catalyzed polymer, at least one ionomer, and at least one non-ionomer.

The narrow molecular weight distributions of metallocene-catalyzed polymers provide more uniform compositions and improved mechanical properties when compared to polyolefins polymerized with conventional catalysts. In addition, when the metallocene-catalyzed polymer is modified by a post-polymerization reaction to add at least one pendant functional group to the metallocene-catalyzed polymer, the compatibility of the resulting grafted metallocene-catalyzed polymer with other polymers, and with ionomers in particular, is improved. As a result, blends of grafted metallocene-catalyzed polymers, ionomers, and non-ionomers have superior golf ball properties, including performance and durability. For example, as demonstrated in the examples below, a compatible blend of a grafted metallocene-catalyzed polymer, an ionomer, and a non-ionomer results in a golf ball cover composition that provides increased softness ("feel") without losing resilience or distance (for a given cover hardness), when compared to covers comprising a blend of a grafted metallocene-catalyzed polymer and an ionomer. Additionally, golf balls constructed with the cover blends of the present invention exhibit increased control, in part due to decreased driver spin and increased wedge spin.

When a layer of foamed or unfoamed metallocene-catalyzed polymer or polymer blend is used in a golf ball cover or mantle, the ball has a softer feel than a ball made using a hard ionomer. Moreover, when the layer in the cover or the mantle comprises a grafted metallocene-catalyzed polymer or polymer blend, the performance of the resulting golf ball, in particular, the initial velocity, is also significantly improved.

The use of foamed grafted metallocene-catalyzed polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Grafted metallocene-catalyzed polymers useful in the golf balls of the invention are available in experimental quantities from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and nonbornene, more preferably, butene, pentene, hexene, heptene, octene, and nonbornene, and most preferably butene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

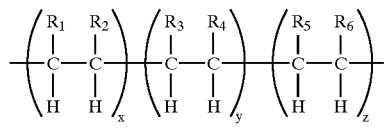

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic;

$R_4$ is selected from the group consisting of H, $C_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

Preferably, the preferred grafted metallocene-catalyzed polymer is formed by grafting a functional group onto a metallocene-catalyzed polyethylene or a metallocene-catalyzed polymer of the formula given above in which $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1 to 10 carbon atoms, and $R_4$ is a lower alkyl group having from 1 to 10 carbon atoms. For terpolymers, where z is not zero, $R_5$ is preferably hydrogen or lower alkyl or alkenyl such as carbon chains having 1 to 10 carbon atoms, and $R_6$ is a lower alkyl group having from 1 to 10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

Metallocene-catalyzed copolymers or terpolymers can be random or block copolymers or terpolymers, and may be isotactic, syndiotactic or atactic. The pendant groups creating the isotactic, syndiotactic or atactic polymers are chosen to determine the interactions between the different polymer chains making up the resin to control the final properties of the resins used in golf ball covers, centers, or mantles. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, nonbornene, nonene, decene and the like. The ordinary skilled artisan is familiar with numerous linear and branched alkyl groups, all of which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "substituted and unsubstituted aryl groups" includes, but is not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow of Michigan. Other commercially available metallocene-catalyzed polymers can be used such as Exxon's EXACT® and Dow's INSIGHT® line of resins which have superior flexibility and clarity as well as toughness. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding. The foamed grafted metallocene-catalyzed polymers sheets are available in thicknesses ranging from about 0.027 to 0.625 inches. Closed cell bun stock is also available in thicknesses of up to 4 inches.

Grafted metallocene-catalyzed polymers functionalized with pendant groups, such as maleic anhydride and the like, are commercially available from E.I. DuPont de Nemours and Co., Inc of Wilmington, Del., and include, for example, SURLYN® NMO 525D, SURLYN® NMO 524D, and SURLYN® NMO 499D, formerly known as the FUSABOND® family of polymers.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to any reaction to which an anhydride may be subject to form a grafted metallocene-catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula

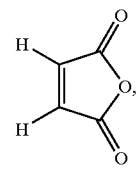

may be grafted onto a metallocene-catalyzed polymer by means of a post-polymerization reaction, as described above. The maleic anhydride will graft onto a metallocene-catalyzed polymer of formula

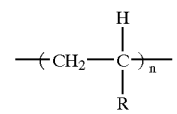

to form a grafted metallocene-catalyzed polymer of formula

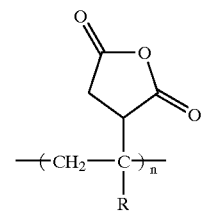

Where R is not H, the monomer being grafted to the metallocene-catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted metallocene-catalyzed polymer may be reacted with water to form

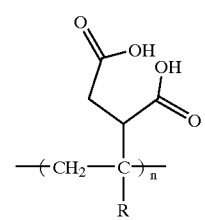

which may be further reacted with a base of formula MOH to form an ionomer of formula

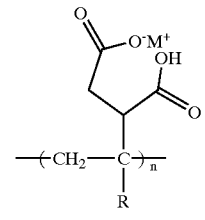

formula

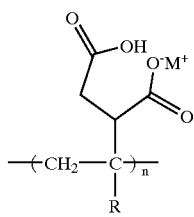

or formula

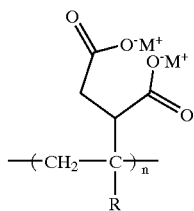

or reacted with a base of formula M(OH)₂ to form an ionomer of formula

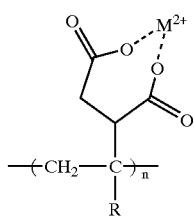

A maleic anhydride grafted metallocene-catalyzed polymer may also be reacted with ammonia to form

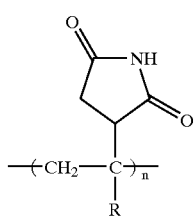

It has been discovered that maleic anhydride grafted metallocene-catalyzed polymers are formed of highly compatible blends with ionomers and other thermoplastic polymers.

In addition, unsaturated carboxylic acids, such as methacrylic and acrylic acid, can be grafted to a metallocene-catalyzed polymer to form

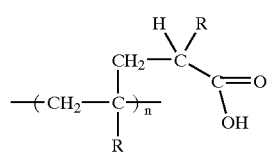

which may be reacted with a base to form an ionomer. Sulfur compounds, such as $H_2SO_4$, $ClSO_3H$, or $SO_3$, when grafted to a metallocene-catalyzed polymer will form polymers of formula

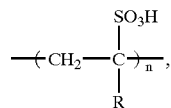

Grafting a vinyl ester of formula $CH_2=CH-COOR$ gives polymers of formula

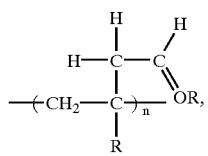

and a primary or secondary amine or other suitable nitrogen compound provides polymers of formula

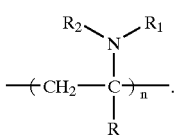

If a monomer of formula

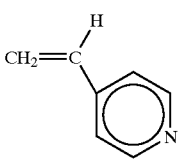

is used, the resulting grafted metallocene-catalyzed polymer of formula

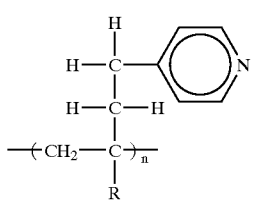

may be reacted with an acid or acid derivative or a compound of formula $R^+X^-$, where R may be a linear or branched alkyl group having from 1 to 12 carbon atoms, and X may be a halide, to form a cationic ionomer.

The grafted metallocene-catalyzed polymer blend golf ball compositions of the present invention comprise compatible blends of at least one grafted metallocene-catalyzed polymer, at least one ionomer, and at least one non-ionomer. Blends useful in the golf ball of the invention may be formed using blending methods well known in the art. In particular, the grafted metallocene-catalyzed polymer blends comprise compatible blends of grafted metallocene-catalyzed polymers, ionomers, such as ethylene methacrylic acid ionomers and ethylene acrylic acid ionomers, and their terpolymers, sold commercially under the tradenames SURLYN® and IOTEK® by DuPont and Exxon, respectively, and non-ionomers, such as NUCREL®, also sold commercially by DuPont.

The grafted metallocene-catalyzed polymers useful in the golf balls of the invention can also be blended with non-grafted metallocene-catalyzed polymers and other non-ionomeric polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenylmethylethylene), poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(silanes) and poly(silazanes), main-chain heterocyclic polymers, polyurethanes, polyamides, polyimides, polyesters, polyethers, and polycarbonates, polyketones, poly(trimethylene terephthalate), polyphenylene ether, poly(butylene terepthalate), or a combination thereof, as well as the classes of polymers to which they belong.

Any non-ionomeric polymer available to one of ordinary skill in the art may be included in the blends according to the invention. Preferred non-ionomeric polymers include acid-containing ethylene copolymers, such as ethylene/acrylic acid; ethylene/methacrylic acid; ethylene/acrylic acid/n- or isobutyl acrylate; ethylene/methacrylic acid/n- or iso-butyl acrylate; ethylene/acrylic acid/methyl acrylate; ethylene/methacrylic acid/methyl acrylate; ethylene/acrylic acid/isobornyl acrylate or methacrylate and ethylene/methacrylic acid/isobornyl acrylate or methacrylate, and combinations thereof. Below is a non-limiting example of the chemical structure for suitable ethylene methacrylic/acrylic acid copolymers:

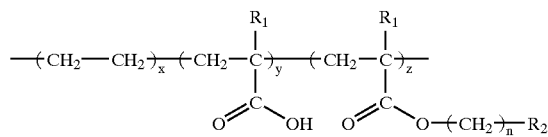

wherein x=50 to 99%; y=1 to 50%; z=0 to 49%; $R_1$=H or $CH_3$; $R_2$=alkyl groups, such as methyl, ethyl, propyl, butyl, pentyl, hexyl, hectyl, octyl, and isobornyl; and n=0 to 12. Suitable ethylene methacrylic/acrylic acid copolymers are sold commercially by DuPont under the tradename NUCREL®. Preferably, the acid-containing ethylene copolymers contain from about 10% to about 15% methacrylic acid.

The preferred golf ball compositions comprise one or more ionomer resins having a flexural modulus from about 1000 psi to about 200,000 psi, a grafted metallocene-catalyzed copolymer of an olefin having a flexural modulus from about 500 psi to about 100,000 psi, and at least one non-ionomer having a flexural modulus from about 500 to about 100,000 psi. More preferably, the ionomer resins having a flexural modulus from about 20,000 psi to about 80,000 psi, a grafted metallocene-catalyzed copolymer of an olefin having a flexural modulus from about 1000 psi to 50,000 psi, and at least one non-ionomer having a flexural modulus from about 500 to about 75,000 psi.

In a more preferred embodiment of the present invention, a maleic anhydride grafted metallocene-catalyzed polymer is combined with a blend of ionomers and an ethylene-methacrylic acid non-ionomer to form a combination blend suitable for use in golf ball centers, mantle layers, covers, or a combination thereof. In a most preferred embodiment of the present invention, a maleic anhydride grafted metallocene-catalyzed polymer is combined with a blend of a Li-ionomer and a Na-ionomer, and an ethylene-methacrylic acid non-ionomer to form a combination blend suitable for use in a golf ball, preferably in golf ball covers.

The amounts of maleic anhydride grafted metallocene-catalyzed polymers used in the golf ball compositions of the invention can vary from about 5 to about 50 phr of the grafted metallocene-catalyzed polymers, from about 95 to about 50 phr of ionomer, and from about 1 to about 25 phr of non-ionomer, preferably, from about 10 to about 40 phr grafted metallocene-catalyzed polymers, from about 90 to about 60 phr of ionomer, and about 1 to about 20 phr of non-ionomer. The most preferred amounts are from about 15 to 25 phr grafted metallocene-catalyzed polymer, from about 85 to about 75 phr of ionomer, and about 1 to about 10 phr of non-ionomer.

Grafted metallocene-catalyzed polymer blend layers may be produced in golf balls in accordance with the present invention by injection molding or compression molding a layer of grafted metallocene-catalyzed polymer blend material about a previously formed center and/or core, cover, or mantle layer. Cores comprising a grafted metallocene-catalyzed polymer blend may also be formed directly by injection molding or compression molding. When the layer or core is injection molded, a physical or chemical blowing or foaming agent may be included to produce a foamed layer. Blowing or foaming agents useful in forming foamed grafted metallocene-catalyzed polymer blends include, but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthane; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed grafted metallocene-catalyzed polymer blends may be formed by blending microspheres with the grafted metallocene-catalyzed polymer blend either during or before the molding process. Polymeric, ceramic, metal, and glass microspheres are useful in the invention, and may be solid or hollow and filled or unfilled. Microspheres up to about 1,000 μm in diameter are useful in the grafted metallocene-catalyzed polymer blends of the invention.

For compression molded grafted metallocene-catalyzed polymer blend layers, half-shells may be made by injection molding a grafted metallocene-catalyzed polymer blend in a conventional half-shell mold or by compression molding sheets of foamed grafted metallocene-catalyzed polymer. The half-shells are placed about a previously formed center or core, cover, or mantle layer, and the assembly is introduced into a compression molding machine, and compression molded at about 250° F. to about 400° F. The molded balls are then cooled while still in the mold, and finally removed when the layer of grafted metallocene-catalyzed polymer blend is hard enough to be handled without deforming. Additional center, mantle, and cover layers are then molded onto the previously molded layers, as needed, until a complete ball is formed. After the final cover layer of the ball has been molded, the ball undergoes various conventional finishing operations such as buffing, painting and stamping.

Blending of the grafted metallocene-catalyzed polymer and ionomer resins is accomplished in a conventional manner using conventional equipment. Good results have been obtained by mixing the grafted metallocene-catalyzed polymer, ionomers, and non-ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted metallocene-catalyzed polymer blend using a retractable-pin mold. Such machines are conventional.

EXAMPLES

The following examples are provided only for the purpose of illustrating the invention and are not to be construed as limiting the invention in any manner.

Example 1

Golf balls of the present invention can be manufactured as follows. The core may be made using either a conventional wound core construction or a conventional two-piece core construction formed using methods well known in the art. The wound core construction can be either a solid rubber-based center or a liquid filled center around which a length of elastic thread is wound. A conventional two-piece construction preferably comprises a cis-1,4 polybutadiene rubber that has been crosslinked with a metal salt of an unsaturated fatty acid such as zinc diacrylate.

These core constructions are then covered using a conventional compression molding technique with an inner cover layer of an ionomer having a methacrylic acid content of at least about 16 weight percent (preferably SURLYN® 8140 or SURLYN® 8546).

The outer cover layer can be formed following the processes set forth in U.S. Pat. No. 5,006,297 and U.S. Pat. No. 5,334,673. A particularly desired material for forming the outer cover layer is 40D castable urethane.

It is believed that golf balls made in accordance with the present invention will exhibit an appreciably lower spin rate when struck with a driver (and thus a greater overall distance) as compared to conventional "high performance" golf balls (e.g. Titleist® Tour Balata), but have very similar or even higher spin rates when struck with an 8 iron and/or a 50-yard wedge, thereby evidencing a "progressive performance" from driver to wedge in the golf balls of the present invention.

While it is apparent that the illustrative embodiments of the invention herein discloses fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

Examples 2–8

Sample golf balls having multi-layered cores and thin thermoset outer covers were made and tested to determine the effects of the following eight construction variables on the balls' physical and performance properties:

| Construction Variable | Low | High |
| --- | --- | --- |
| Dual core Center Diameter (in.) | 1 | 1.13 |
| Center Hardness (parts of crosslinking agent per hundred parts rubber) | 19 | 25 |
| Outer Core Layer Diameter (in.) | 1.55 | 1.57 |
| Outer Cover Hardness (Shore D) | 50 | 60 |
| Inner Cover Diameter (in.) | 1.62 | 1.63 |
| Outer Core Layer Balata Level (parts per hundred of rubber) | 10 | 17 |
| Inner cover Hardness (Shore D) | 68 | 72 |
| Outer Core Layer Hardness (parts of crosslinking agent per hundred parts of rubber) | 30 | 38 |

Seven groups of balls within the parameters listed above, and having ball weights similar to the weights of commercially available balls used for performance comparisons, were selected for spin testing. Physical properties of these seven ball groups are listed below:

| Test Group | Center Diameter (in) | Center Hardness (Shore D) | Outer Core Layer Diameter (in) | Outer Core Layer Hardness (Shore D) | Outer Core Layer Balata Level (phr rubber) | Inner Cover Diameter (in) | Inner Cover Hardness (Shore D) | Outer Cover Hardness (Shore D) |
| --- | --- | --- | --- | --- | --- | --- | --- | --- |
| 1 | 1 | 19 | 1.55 | 38 | 17 | 1.63 | 68 | 60 |
| 2 | 1 | 25 | 1.55 | 30 | 17 | 1.62 | 72 | 60 |
| 3 | 1 | 25 | 1.57 | 38 | 17 | 1.62 | 68 | 50 |
| 4 | 1.13 | 19 | 1.57 | 38 | 0 | 1.63 | 68 | 50 |
| 5 | 1 | 19 | 1.57 | 30 | 17 | 1.63 | 72 | 50 |
| 6 | 1.13 | 25 | 1.55 | 30 | 17 | 1.63 | 68 | 50 |
| 7 | 1.13 | 19 | 1.55 | 38 | 17 | 1.62 | 72 | 50 |

Each ball group was tested for launch angle, spin rate and initial velocity under long shot (i.e., driver) and short shot (i.e., wedge and short iron) conditions. The test results were compared with tested values for commercially available golf balls, including the Pinnacle Gold LS and the Tour Balata. The Pinnacle Gold LS is well-known by those skilled in the art to have low-spin, long distance performance characteristics, whereas the Tour Balata is widely recognized as a high spin, short shot ball.

Two pairs of tests were established for analyzing long shot and short shot performance of each ball. For spin testing under long shot conditions, one test, identified below as "Standard Driver", was based upon USGA parameters for distance testing using a Pinnacle Gold LS ball. The "Standard Driver" test is designed to reflect the driving conditions imparted on the ball by a professional tour player. In particular, calibration of parameters for the "Standard Driver" test are that a Pinnacle Gold LS ball has a launch angle of 9 degrees, a spin rate of 3000 rpm and an initial velocity of 160 mph. After calibration, the balls are tested and compared to the performance of the Pinnacle Gold LS. The test results for the "Standard Driver" test were as follows:

SPIN TEST RESULTS: STANDARD DRIVER

| Ball Type | Launch Angle (degrees) | Ball Spin (rpm) | Initial Velocity (mph) |
| --- | --- | --- | --- |
| Pinnacle Gold LS | 9.4 | 3018 | 160.1 |
| Tour Balata | 8.4 | 4292 | 158.7 |
| Test Group #1 | 9.2 | 3096 | 159.0 |
| Test Group #2 | 9.1 | 3116 | 157.0 |
| Test Group #3 | 8.9 | 3246 | 160.1 |
| Test Group #4 | 9.2 | 2981 | 159.7 |
| Test Group #5 | 9.1 | 3371 | 157.3 |
| Test Group #6 | 9.1 | 3065 | 158.7 |
| Test Group #7 | 9.0 | 3130 | 157.5 |

The second test for long shot performance, identified below as "Average Driver", is designed to reflect the driving conditions imparted on the ball by a recreational player. Specifically, calibration of parameters for the "Average Driver" test are that a Pinnacle Gold LS ball have a launch angle of 10.5 degrees, a spin rate of 3600 rpm and an initial velocity of 140 mph. After calibration, the balls are tested and compared to the performance of the Pinnacle Gold LS. The test results for the "Average Driver" test were as follows:

SPIN TEST RESULTS: AVERAGE DRIVER

| Ball Type | Launch Angle (degrees) | Ball Spin (rpm) | Initial Velocity (mph) |
| --- | --- | --- | --- |
| Pinnacle Gold LS | 10.3 | 3545 | 140 |
| Tour Balata | 8.8 | 4852 | 138.6 |
| Test Group #1 | 9.8 | 3672 | 139.3 |
| Test Group #2 | 9.8 | 3536 | 137.9 |
| Test Group #3 | 9.8 | 3923 | 139.9 |
| Test Group #4 | 10.2 | 3482 | 139.1 |
| Test Group #5 | 9.9 | 3797 | 137.8 |
| Test Group #6 | 10.1 | 3572 | 138.9 |
| Test Group #7 | 9.9 | 3611 | 137.8 |

One test for simulating short shot conditions, identified below as "Standard 8 Iron", is designed to reflect tour player performance using an 8 iron. Specifically, calibration of parameters for the "Standard 8 Iron" test are that a Tour Balata ball have a launch angle of 18 degrees, a spin rate of 9000 rpm and an initial velocity of 115 mph. After calibration, the balls are tested and compared to the performance of the Tour Balata. The test results for the "Standard 8 Iron" test were as follows:

SPIN TEST RESULTS: STANDARD 8 IRON

| Ball Type | Launch Angle (degrees) | Spin (rpm) | Initial Velocity (mph) |
| --- | --- | --- | --- |
| Pinnacle Gold LS | 19.1 | 7892 | 116.1 |
| Tour Balata | 18.1 | 9051 | 114.4 |
| Test Group #1 | 19.8 | 7129 | 115.4 |
| Test Group #2 | 20.1 | 6856 | 115.2 |
| Test Group #3 | 19.0 | 7993 | 115.7 |
| Test Group #4 | 20.1 | 6692 | 115.7 |
| Test Group #5 | 19.2 | 7721 | 114.9 |
| Test Group #6 | 19.9 | 7042 | 115.4 |
| Test Group #7 | 20.2 | 6667 | 115.5 |

A second test for simulating short shot conditions, identified below as "Half Wedge", is designed to reflect tour player performance using an half wedge. Specifically, calibration of parameters for the "Half Wedge" test are that a Tour Balata ball have a launch angle of 30 degrees, a spin rate of 7000 rpm and an initial velocity of 52 mph. After calibration, the balls are tested and compared to the performance of the Tour Balata. The test results for the "Half Wedge" test were as follows:

SPIN TEST RESULTS: HALF WEDGE

| Ball Type | Launch Angle (degrees) | Ball Spin (rpm) | Initial Velocity (mph) |
| --- | --- | --- | --- |
| Pinnacle Gold LS | 33.8 | 5244 | 52.4 |
| Tour Balata | 30.5 | 7142 | 51.6 |
| Test Group #1 | 30.9 | 6413 | 51.9 |
| Test Group #2 | 31.1 | 6259 | 52.4 |
| Test Group #3 | 29.8 | 6811 | 52.1 |
| Test Group #4 | 31.1 | 6314 | 52.4 |
| Test Group #5 | 30.7 | 6538 | 52.5 |
| Test Group #6 | 30.6 | 6380 | 52.5 |
| Test Group #7 | 31.3 | 6168 | 52.3 |

What is claimed is:

1. A golf ball comprising:
    a core;
    an intermediate layer formed from a polymer blend having a flexural modulus of between about 65,000 psi and about 120,000 psi comprising a first material and a second material comprising a grafted-metallocene polymer; and
    a cover layer comprising a castable reactive liquid material.

2. The golf ball of claim 1, wherein the grafted metallocene polymer is formed from homopolymers and copolymers of ethylene; and a second olefin comprising propylene, butene, pentene, hexene, heptene, octene, and norbornene.

3. The golf ball of claim 1, wherein the grafted metallocene polymer is produced by grafting a functional group onto a metallocene-catalyzed polymer having the formula:

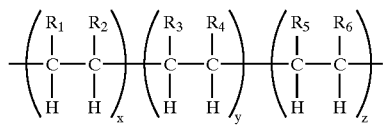

wherein:
- $R_1$ is hydrogen, branched or straight chain alkyl methyl, ethyl, propyl, butyl, pentyl, hexyl, heptyl, and octyl, carbocyclic, aromatic or heterocyclic;
- $R_2$ is hydrogen, lower alkyl selected from the group consisting of $C_1$–$C_5$, carbocyclic, aromatic and heterocyclic;
- $R_3$ is hydrogen, lower alkyl selected from the group consisting of $C_1$–$C_5$, carbocyclic, aromatic and heterocyclic;
- $R_4$ is selected from the group consisting of H, $C_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;
- $R_5$ is hydrogen, lower alkyl $C_1$–$C_5$, carbocyclic, aromatic or heterocyclic;
- $R_6$ is hydrogen, lower alkyl $C_1$–$C_5$, carbocyclic, aromatic or heterocyclic; and
- wherein x ranges from 1–99 percent, y ranges from 99–1 percent, and z ranges from 0 to 49 percent.

4. The golf ball of claim 1, wherein the castable reactive liquid material comprises thermoset or thermoplastic polyurethanes, polyureas, urethane ionomers, urethane epoxies, or a mixture thereof.

5. The golf ball of claim 1, wherein the grafted metallocene polymer is functionalized by sulfonation, carboxylation, the addition of an amine or hydroxy group, or a mixture thereof.

6. The golf ball of claim 1, wherein the grafted metallocene polymer is a maleic anhydride grafted metallocene polymer.

7. The golf ball of claim 1, wherein the grafted-metallocene polymer is foamed or unfoamed.

8. The golf ball of claim 1, wherein the polymer blend further comprises a non-ionomer.

9. The golf ball of claim 1, wherein the intermediate layer has an outer diameter of between about 1.58 and about 1.64 inches.

10. The golf ball of claim 1, wherein the outer cover has a Shore D hardness of between about 30 and about 60.

11. The golf ball of claim 1, wherein the intermediate layer has a Shore D hardness of about 65 to about 80.

12. The golf ball of claim 1, wherein the intermediate layer has a thickness of no greater than about 0.055 inches.

13. The golf ball of claim 1, wherein the outer cover layer has a thickness of less than about 0.05 inches.

* * * * *